United States Patent
Yamazaki et al.

(10) Patent No.: US 7,424,305 B2
(45) Date of Patent: Sep. 9, 2008

(54) BASE STATION, MOBILE STATION, COMMUNICATION SYSTEM, AND COMMUNICATION METHOD

(75) Inventors: Takahiko Yamazaki, Tokyo (JP); Michiaki Takano, Tokyo (JP); Ryoichi Fujie, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 111 days.

(21) Appl. No.: 10/556,730

(22) PCT Filed: May 13, 2004

(86) PCT No.: PCT/JP2004/006811

§ 371 (c)(1),
(2), (4) Date: Nov. 14, 2005

(87) PCT Pub. No.: WO2004/102835

PCT Pub. Date: Nov. 25, 2004

(65) Prior Publication Data

US 2006/0240858 A1    Oct. 26, 2006

(30) Foreign Application Priority Data

May 16, 2003    (JP) .............................. 2003-138888

(51) Int. Cl.
H04B 7/00    (2006.01)
(52) U.S. Cl. ........................... 455/522; 455/68; 455/69; 455/115.3; 370/318
(58) Field of Classification Search ................. 455/522, 455/69, 68, 115.3, 126, 127.1, 296, 127.2, 455/135, 226.3, 277.2; 370/318
See application file for complete search history.

(56) References Cited

U.S. PATENT DOCUMENTS 6,768,727 B1 *    7/2004    Sourour et al. ............... 370/335
7,209,456 B2 *    4/2007    Kwak et al. .................. 370/318

(Continued)

FOREIGN PATENT DOCUMENTS

JP    11-234203    8/1999

(Continued)

OTHER PUBLICATIONS

"3GPP Specification TS25.214 V5.4.0", p. 38, Mar. 2004.

(Continued)

*Primary Examiner*—Matthew Anderson
*Assistant Examiner*—Dominic E Rego
(74) *Attorney, Agent, or Firm*—Oblon, Spivak, McClelland, Maier & Neustadt, P.C.

(57) ABSTRACT

A base station communicates with plural mobile stations using a common channel common to the mobile stations, and a predetermined number of a plurality of shared channels assigned to the mobile stations. The base station includes a scheduler that acquires, for each of the mobile stations, a transmitting power ratio being a ratio of a mobile station assigning power, which is a sum of transmitting powers of the shared channels assigned to the mobile station, and a transmitting power of the common channel. The scheduler determines the mobile station assigning power of the mobile station and then selects communication destination mobile stations, so that a sum of the mobile station assigning powers does not exceed a predetermined maximum assignable power.

17 Claims, 10 Drawing Sheets

U.S. PATENT DOCUMENTS

| | | | |
|---|---|---|---|
| 2002/0010001 A1* | 1/2002 | Dahlman et al. | 455/522 |
| 2002/0061731 A1* | 5/2002 | Takano et al. | 455/67.1 |
| 2002/0094833 A1* | 7/2002 | Lieshout et al. | 455/522 |
| 2003/0036361 A1* | 2/2003 | Kawai et al. | 455/69 |
| 2003/0123396 A1* | 7/2003 | Seo et al. | 370/252 |
| 2004/0114555 A1* | 6/2004 | Hayashi et al. | 370/329 |
| 2004/0224692 A1* | 11/2004 | Hamabe | 455/442 |
| 2004/0248606 A1* | 12/2004 | Suzuki et al. | 455/522 |
| 2005/0143113 A1* | 6/2005 | Lee et al. | 455/522 |
| 2005/0170786 A1* | 8/2005 | Chen et al. | 455/69 |
| 2005/0186983 A1* | 8/2005 | Iochi | 455/522 |
| 2005/0226199 A1* | 10/2005 | Kimura | 370/345 |
| 2005/0289258 A1* | 12/2005 | Uehara et al. | 710/71 |
| 2006/0270443 A1* | 11/2006 | Lundby et al. | 455/522 |

FOREIGN PATENT DOCUMENTS

| | | |
|---|---|---|
| JP | 2000-224231 | 8/2000 |
| JP | 2002-118515 | 4/2002 |
| JP | 2002-261687 | 9/2002 |
| JP | 2002-369258 | 12/2002 |
| WO | 02/47408 | 6/2002 |
| WO | 03/085934 | 10/2003 |
| WO | 2005/032075 | 4/2005 |
| WO | 2005/084066 | 9/2005 |

OTHER PUBLICATIONS

"3GPP Specification TS25.214 V5.4.0 6A.2", pp. 38-43, Mar. 2004.

"3GPP Specification TS 25.433 V5.4.0", pp. 56-63, Mar. 2004.

3GPP TS 25.214 V5.1.0 (Jun. 2002); 3$^{rd}$ Generation Partnership Project; Technical Specification Group Radio Access Network; Physical layer procedures (FDD) (Release 5).

* cited by examiner

FIG.2

| CQI value | Transport Block Size | Number of HS-PDSCH | Modulation | Reference power adjustment Δ | $N_{IR}$ | $X_{RV}$ |
|---|---|---|---|---|---|---|
| 0 | N/A | Out of range ||||||
| 1 | 137 | 1 | QPSK | 0 | 28800 | 0 |
| 2 | 173 | 1 | QPSK | 0 | | |
| 3 | 233 | 1 | QPSK | 0 | | |
| 4 | 317 | 1 | QPSK | 0 | | |
| 5 | 377 | 1 | QPSK | 0 | | |
| 6 | 461 | 1 | QPSK | 0 | | |
| 7 | 650 | 2 | QPSK | 0 | | |
| 8 | 792 | 2 | QPSK | 0 | | |
| 9 | 931 | 2 | QPSK | 0 | | |
| 10 | 1262 | 3 | QPSK | 0 | | |
| 11 | 1483 | 3 | QPSK | 0 | | |
| 12 | 1742 | 3 | QPSK | 0 | | |
| 13 | 2279 | 4 | QPSK | 0 | | |
| 14 | 2583 | 4 | QPSK | 0 | | |
| 15 | 3319 | 5 | QPSK | 0 | | |
| 16 | 3565 | 5 | 16-QAM | 0 | | |
| 17 | 4189 | 5 | 16-QAM | 0 | | |
| 18 | 4664 | 5 | 16-QAM | 0 | | |
| 19 | 5287 | 5 | 16-QAM | 0 | | |
| 20 | 5887 | 5 | 16-QAM | 0 | | |
| 21 | 6554 | 5 | 16-QAM | 0 | | |
| 22 | 7168 | 5 | 16-QAM | 0 | | |
| 23 | 9719 | 7 | 16-QAM | 0 | | |
| 24 | 11418 | 8 | 16-QAM | 0 | | |
| 25 | 14411 | 10 | 16-QAM | 0 | | |
| 26 | 17300 | 12 | 16-QAM | 0 | | |
| 27 | 21754 | 15 | 16-QAM | 0 | | |
| 28 | 23370 | 15 | 16-QAM | 0 | | |
| 29 | 24222 | 15 | 16-QAM | 0 | | |
| 30 | 25558 | 15 | 16-QAM | 0 | | | ously made multimedia-compatible
BASE STATION, MOBILE STATION, COMMUNICATION SYSTEM, AND COMMUNICATION METHOD

TECHNICAL FIELD

The present invention relates to a technique of controlling transmitting power between a base station and a mobile station.

BACKGROUND ART

Recently, mobile terminals (mobile stations) such as cell phones have been increasingly made multimedia-compatible for handling a large amount of still images and short-period moving images, and accordingly, large-capacity high-rate data transmission methods are in demand. Examples of such large-capacity high-rate data transmission methods are the high speed downlink packet access (HSDPA) method, and data transmission methods using high speed physical downlink shared channels (HS-PDSCH) in which only the downlink transmission rate (from a base station to a mobile station) is increased.

In such a data transmission method, to transmit a large amount of data from a communications network to a mobile station via a base station, the data is packetized and transmitted using the HS-PDSCH, and to transmit a large amount of data at once to a plurality of mobile stations, this high speed physical downlink shared channel, referred to as HS-PDSCH, is shared by the mobile stations based on scheduling of a base station scheduler. That is, transmission priorities of the mobile stations are determined in each transmission unit of time, and for example, when 15 HS-PDSCHs are provided as code resources, scheduling is carried out so that 10 HS-PDSCHs are assigned to a mobile station with the first transmission priority, three HS-PDSCHs are assigned to a mobile station with the second transmission priority, and two HS-PDSCHs are assigned to a mobile station with the third transmission priority.

In the scheduling, a method known as adaptive modulation is employed, in which, a modulation method and a coding ratio are determined according to quality of a radio channel between the base station and the assigned target mobile stations, and code resources for each assigned target mobile station are determined. Each mobile station informs the base station of the radio channel quality as a channel quality indicator (CQI). The values of CQI are defined as shown in Tables 7A, 7B, 7C, 7D, and 7E in 3GPP Specification TS25.214V5.4.0.

A CQI value derivation method in the HSDPA method is described in 3GPP Specification TS25.214V5.4.0 6A.2.

Namely, the electric power to be received for all HS-PDSCHs of a mobile station is estimated by adding the logarithm of an offset $\Gamma$ (measured power offset informed by the higher-level layer) to the received common pilot channel (CPICH) power of the mobile station. Furthermore, the mobile station uses the HS-PDSCH power as a desired signal power, calculates its ratio to interference power, and determines the CQI on the basis of the calculated ratio. In 3GPP Specification TS25.433V5.4.0 8.2.17.2, it is mentioned that $\Gamma$ is set by an upper-level parameter. Specifically, $\Gamma$ is set in response to the node B application part (NBAP) message "Radio Link Set Up."

However, these documents neither regulate the method of assignment of mobile stations by a scheduler, nor clearly regulate the definition of the offset $\Gamma$, that is, whether $\Gamma$ is a power offset of all the HS-PDSCHs with respect to the CPICH transmitted by a base station, or a power offset of each mobile station with respect to the CPICH. Therefore, if assignment of mobile stations by a scheduler is not properly carried out, this may result in improper assignment, in that the total of transmitting powers of HS-PDSCHs of a base station may exceed the permitted power. That is, power obtained by subtracting the power of other individual channels and the power of a common channel from the total transmitting power.

The present invention was made in view of these circumstances, and an object thereof is to propose a method of assignment of mobile stations by a scheduler, and provide a base station that restricts all the transmitting powers of HS-PDSCHs within a predetermined power. Another object is to realize efficient power assignment by setting all the transmitting powers of HS-PDSCHs as a maximum within the predetermined power. Furthermore, still another object is to improve the transmission efficiency by correcting CQIs according to correction of power assignment, to fall within the predetermined power.

DISCLOSURE OF INVENTION

A base station that communicates with a plurality of mobile stations using a common channel and a plurality of shared channels, wherein the common channel is common to the mobile stations, and a predetermined number of the plurality of shared channels can be assigned to the respective mobile stations, the base station including a scheduler that acquires, for each of the mobile stations, a transmitting power ratio that is a ratio of a mobile station assigning power, which is a sum of transmitting powers of the shared channels assigned to the mobile station, and a transmitting power of the common channel; where the scheduler determines the mobile station assigning power of the mobile station from the transmitting power ratio acquired and the transmitting power of the common channel, and the scheduler selects communication destination mobile stations, so that a sum of the mobile station assigning powers does not exceed a predetermined maximum assignable power.

According to the invention, because a base station including the scheduler makes a setting so that the total of HS-PDSCH powers to the respective mobile stations do not exceed the transmitting power of its own HS-PDSCH, it is possible to secure communication quality in a communication system, without the occurrence of an HS-PDSCH that cannot yield a predetermined error ratio performance.

BRIEF DESCRIPTION OF DRAWINGS

FIG. 2 is a diagram of a CQI table related to the invention;

BEST MODE(S) FOR CARRYING OUT THE INVENTION

Exemplary embodiments of the present invention are described in detail with reference to the accompanying drawings. These are not intended to limit the invention.

First Embodiment

A first embodiment is explained with reference to FIG. 1, FIG. 2, and FIG. 3.

Figure 1:
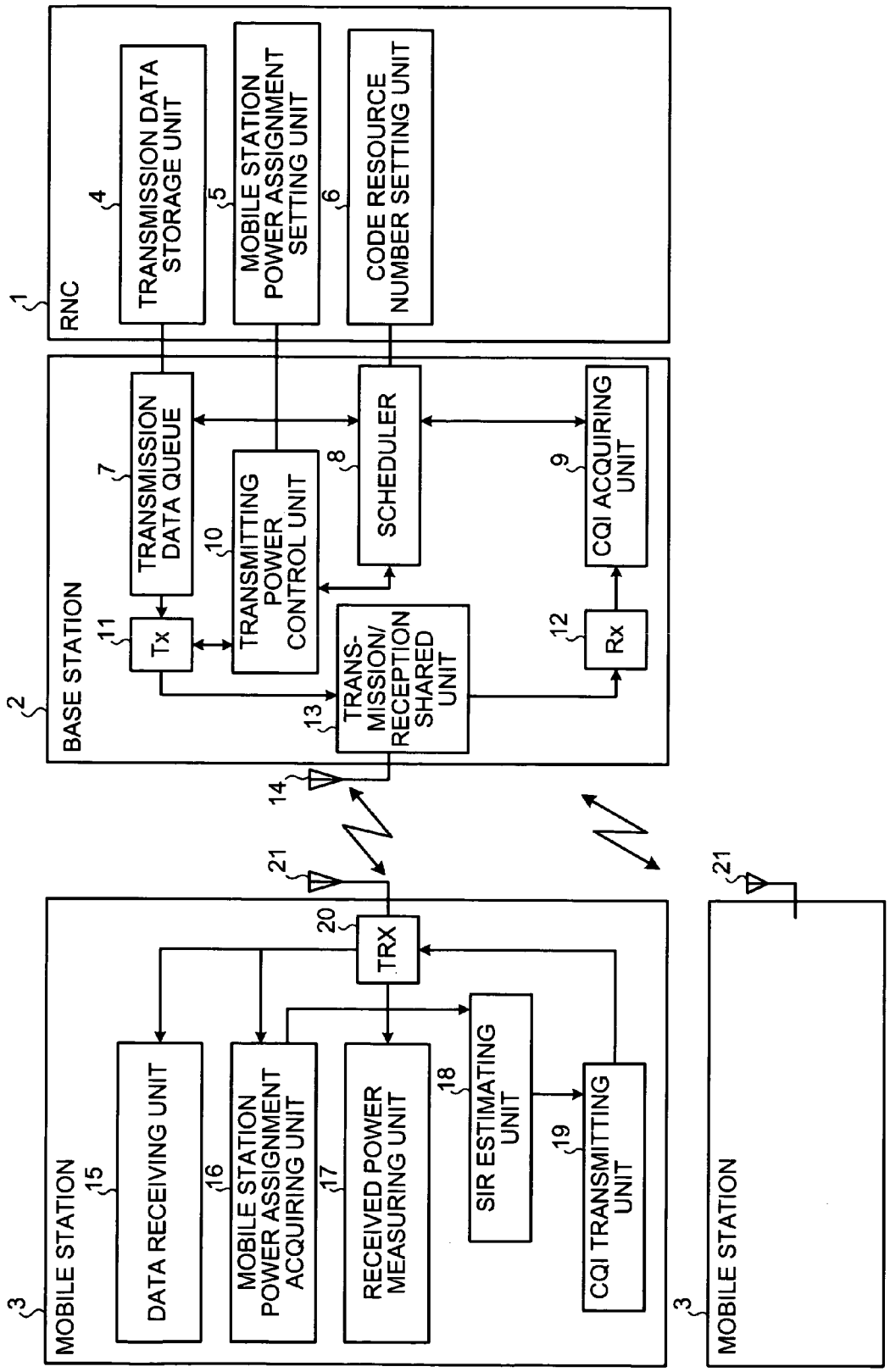
FIG. 1 is a system configuration diagram according to a first embodiment of the invention.

FIG. 1 is a system configuration diagram of the first embodiment of the invention.

A mobile communications system of this first embodiment includes a radio network controller (hereinafter, RNC) 1, a base station 2, and a plurality of mobile stations 3 that communicate with the base station 2.

The base station communicates with each mobile station 3 via a shared channel referred to as a high-speed physical downlink shared channel (HS-PDSCH) and a common channel referred to as common pilot channel (CPICH), in addition to individual channels unique to the respective mobile stations.

The RNC 1 includes a transmission data storage unit 4, a mobile station power assignment setting unit 5 that sets a power offset Γ of HS-PDSCH power to be transmitted to each mobile station 3 from the base station 2 with respect to the CPICH power, and a code resource number setting unit 6 that sets a maximum number of HS-PDSCHs of the base station 2.

The base station 2 includes a transmission data queue 7 that includes transmission queues corresponding to the respective mobile stations 3, a scheduler 8 that assigns the mobile stations 3 to transmit in radio frame transmitting timings in a fixed algorithm according to the status of the transmission data queue 7, CQI values as channel quality indicators of the respective mobile stations, and the number of remaining code resources. The base station 2 also includes a CQI acquiring unit 9 that acquires CQIs from the mobile stations, a transmitting power control unit 10 that restricts the total of requested powers of all channels that should be transmitted within total transmitting power upon measuring the total, a Tx unit 11 that is a transmitting unit, an Rx unit 12 that is a receiving unit, a transmission/reception shared unit 13, and a base station antenna 14.

The mobile station 3 includes a data receiving unit 15, a mobile station power assignment acquiring unit 16 that acquires a power offset Γ for itself from the RNC 1 in response to a node B application part (NBAP) message or the like, a received power measuring unit 17 that measures transmitting/received power and CPICH received power from the base station 2, an SIR estimating unit 18 that calculates an estimate of a signal-interference ratio (SIR) based on received HS-PDSCH power obtained from the CPICH received power and measured at the received power measuring unit 17 and the power offset Γ and other powers, a CQI transmitting unit 19 that determines a CQI based on the SIR estimate calculated by the SIR estimating unit 18 and transmits this CQI to the base station 2, a TRX 20 that is a transmitting/receiving unit, and a mobile station antenna 21.

In the system, when a large amount of data is transmitted from the base station 2 to the mobile station 3, packetized data is transmitted using the HS-PDSCH. When it is required that a large amount of data be transmitted to a plurality of mobile stations 3, a high-speed downlink shared channel known as HS-PDSCH is shared by the mobile stations based on scheduling of the scheduler 8 of the base station 2.

An example of a table of CQIs is shown in FIG. 2. In this diagram, table 7D—defined in Tables 7A, 7B, 7C, 7D, and 7E of "3GPP Specification TS25.214V5.4.0"—is shown as an example.

For example, when CQI #25 is informed from the mobile station 3, the base station 2 can transmit "Transport Block" with up to 14411 bits while satisfying the transmission condition of the block error rate equal to or less than 0.1, and as a modulation method, 16-QAM can be selected, and at this point, necessary code sources are 10 codes (ten HS-PDSCHs). It is assumed that the signal interference power ratio (SIR), or the mobile station's received signal power, rises in 1-dB (decibel) steps with respect to CQI values 1 through 30.

This assumption is for the sake of convenience, and even if steps other than 1-dB are used FIG. 2, this does not lose the features of the invention at all.

Next, operations of the mobile communications system thus configured are explained. In this specification, in all embodiments, the maximum number of HS-PDSCHs of the base station 2 is set to 15 by the code resource number setting unit 6 of the RNC 1. In addition, the ratio of the transmitting power of the CPICH to the total transmitting power P of the base station 2 is 10%, and the ratio of the transmitting powers of all other channels to the base station total transmitting power P is also set to 10%. Therefore, the sum of transmitting powers permitted for all HS-PDSCHs (hereinafter, "predetermined power") is 80% of the total transmitting power of the base station 2.

Figure 3:
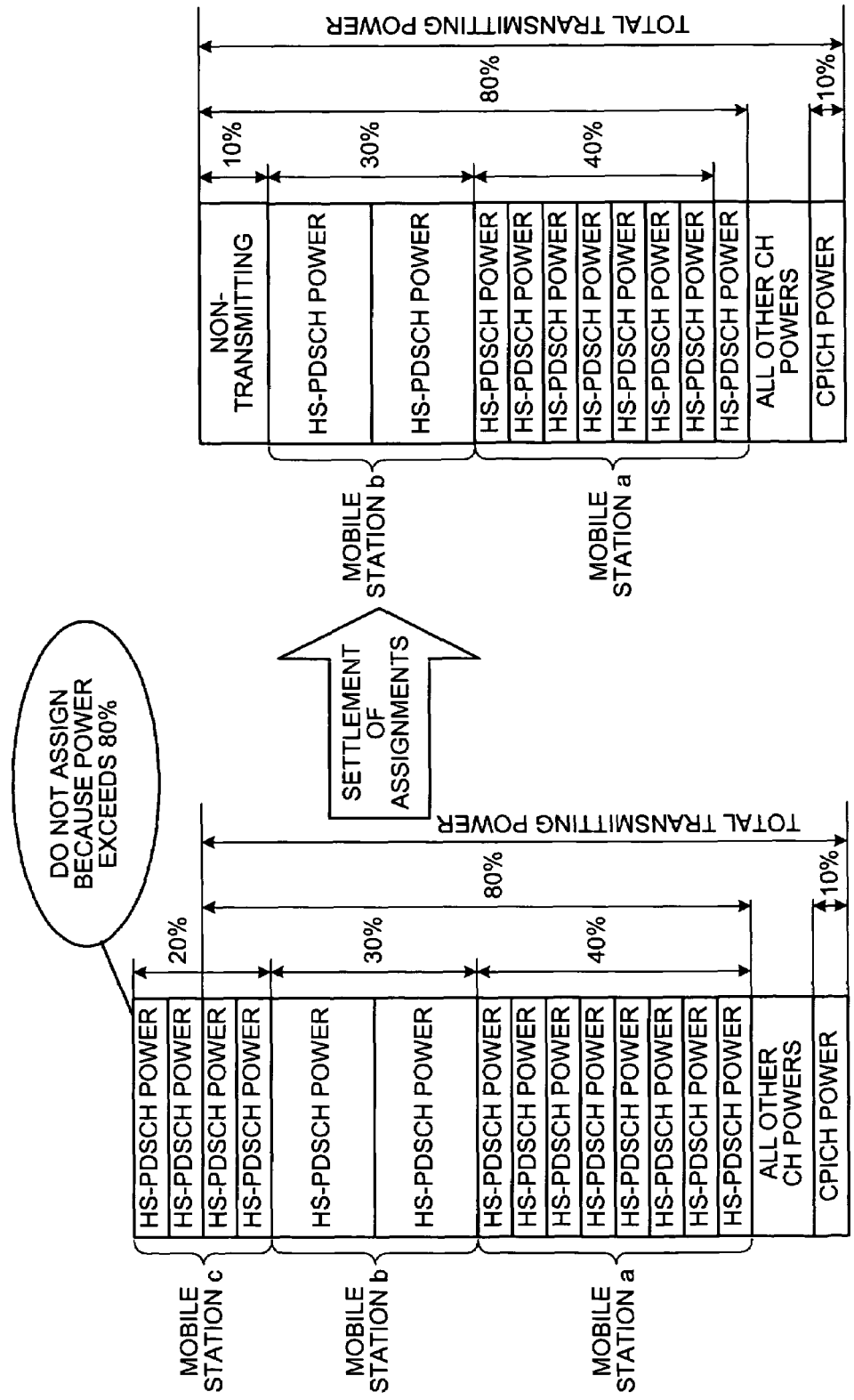
FIG. 3 is a diagram to explain an operation according to the first embodiment of the invention.

FIG. 3 is a diagram to explain a transmitting power assigning operation performed by the scheduler 8 on the base station 2.

The scheduler 8 selects three mobile stations a, b, and c as transmission candidates based on factors such as the status of the transmission data queue 7, CQIs informed by each mobile station 3, and the number of remaining code resources. Herein, the transmission priorities are set to mobile stations a, b, and c in this order.

At this point, it is assumed that, as shown on the left side of FIG. 3, the mobile station power assignment setting unit 5 inside the RNC 1 has assigned transmitting power to the mobile stations, by setting offset F for each mobile station.

The HS-PDSCH powers shown in FIG. 3 are calculated by the following formula:

$$P_{HSPDSCH}=P_{CPICH}+\Gamma+\Delta \text{ in dB} \quad (1)$$

Here, $P_{HSPDSCH}$ is HS-PDSCH transmitting power (dB), and $P_{CPICH}$ is CPICH transmitting power (dB). The reference power adjustment Δ (dB) in Formula (1) is set to 0 here. Formula (1) is an application of the $P_{HSPDSCH}$ calculating formula in the mobile station, as a formula for the base station, and is described on page 38 of "3GPP Specification TS25.214V5.4.0 6A.2".

Namely, to the mobile station a, 40%, that is, four times of the CPICH (10%) is assigned by setting the offset Γ to 6 dB, and likewise, 30% is assigned to the mobile station b by setting the offset Γ to 5 dB, and 20% is assigned to the mobile station c by setting the offset Γ to 3 dB.

These operations are carried out in each radio frame transmitting timing, that is, at predetermined time intervals.

Calculation of $P_{HSPDSCH}$ at the base station does not have to be the Formula (1). When $P_{HSPDSCH}$ is calculated from PCPICH according to other calculating formula, an offset Γ to be set by the mobile station power assignment setting unit 5 can be handled as a parameter in the calculating formula, and can be referred to as a transmitting power calculation parameter.

In this embodiment, the transmitting power control unit 10 acquires each offset Γ from the mobile station power assignment setting unit 5 in response to a "Radio Link Setup" message or the like of the NBAP, and the scheduler 8 acquires the offsets Γ from the transmitting power control unit 10. The scheduler 8 performs assignment at mobile stations selected as transmission candidates within a range that does not exceed a predetermined power of 80%.

That is, the total of powers of the mobile station a and the mobile station b is 70%, and if the mobile station c is added, the percentage becomes 90% that exceeds the predetermined power. Therefore, the scheduler 8 assigns only the mobile stations a and b as transmitting mobile stations (communication destination mobile stations) in response to an instruction of the transmitting power control unit 10, and does not assign the mobile station c.

In FIG. 3, eight HS-PDSCHs are set for the mobile station a, and two HS-PDSCHs are set for the mobile station b, and these are determined depending on the CQI values that are transmitted by the respective mobile stations to the base station 2 according to the "Number of HS-PDSCHs" stored in the table shown in FIG. 2.

As described above, the base station 2 including the scheduler 8 makes a setting to prevent the total of HS-PDSCH powers for the respective mobile stations from exceeding the HS-PDSCH transmitting power of the base station, so that communication quality in the communication system can be secured without the occurrence of an HS-PDSCH that cannot yield a predetermined error ratio performance.

In the explanation given above, the offset Γ is set by the mobile station power assignment setting unit 5 of the RNC 1. However, setting of the offset Γ is not limited thereto, and other means may be used.

In the explanation given above, because the reference power adjustment is Δ=0, the offset Γ is a mobile station assigning power ratio of the transmitting power of the shared channel HS-PDSCH to the transmitting power of the common channel CPICH, when the transmitting powers are considered by means of antilogarithms, and is a transmitting power ratio of the invention. This mobile station assigning power is a sum of transmitting powers assigned to the respective HS-PDSCHs at each mobile station.

Even when Δ is not zero, the transmitting power of the base station can be calculated by Formula (1) with reference to the table of FIG. 2. Even when Δ is not zero, the offset Γ may be referred to as a transmitting power ratio of the HS-PDSCH to the CPICH.

The predetermined power is assignable power with respect to the invention.

The operations in the method of, assignment by the scheduler 8 to the respective mobile stations by calculating $P_{HSPDSCH}$ using Formula (1), that is, the transmitting powers (dB) of HS-PDSCHs may be performed by software (a program) stored in a storage unit (not shown).

The operations of the scheduler 8 in the embodiments described below may be performed by software (a program) stored in a storage unit (not shown).

Second Embodiment

A second embodiment is an extended function of the first embodiment.

In the first embodiment, the total of the powers to be assigned to the mobile stations is 70%, and 10% remains until the predetermined power. Therefore, the scheduler 8 redistributes the residual to the mobile station assigning powers to further reduce transmission errors. Namely, ultimately, transmitting power of "40%×80%/70%=45.7%" is assigned to the mobile station a, and transmitting power of "30%×80%/70%=34.3%" is assigned to the mobile station b.

In this embodiment, the powers to be assigned to HS-PDSCHs of the respective mobile stations are thus increased according to the ratio of the predetermined power of the base station and the sum of the initial assigning powers (in the example given above, 40% and 30%). Thus, the HS-PDSCH transmitting power of the base station can be used in just proportion, transmission errors are reduced, and the communication quality of the communication system improves.

Third Embodiment

A third embodiment is an extended function of the first embodiment.

In the first embodiment, the total of powers to be assigned to the mobile stations is 70%, and there is a 10% residual until the predetermined power. Therefore, the scheduler 8 redistributes the residual to the power to be assigned to a specific mobile station, to further reduce transmission errors. For example, transmission is performed upon ultimately assigning the power of "40%+10%=50%" to the mobile station a.

To decide the mobile station whose HS-PDSCH power is to be increased, the scheduler 8 determines the priorities in advance.

In addition to redistributing the whole residual to one mobile station, it is also possible that, for example, the residual is divided equally and redistributed to a plurality of mobile stations.

In this embodiment, by increasing the HS-PDSCH assigning power of a mobile station, it becomes possible to use the HS-PDSCH transmitting power of the base station in just proportion, transmission errors are reduced, and the communication quality of the communication system can be improved.

Fourth Embodiment

A fourth embodiment is an expanded function of the second embodiment or the third embodiment.

In the third embodiment, the scheduler 8 redistributes 40% to 50% power to the mobile station a, and this results in a power increase of 1 dB.

In the fourth embodiment, when the CQI value informed by the mobile station a is 10, the CQI value is corrected to 11, and then adaptive modulation is applied.

It is assumed that the CQI table of FIG. 2 is prepared so that the mobile station received signal power difference at an adjacent CQI value becomes a 1-dB step-up. Thereby, data with a larger "transport block size" can be transmitted to the mobile station b, and this contributes to throughput improvement.

As an extension to the second embodiment, a similar CQI correction is carried out for all assigning mobile stations according to the power redistribution.

Fifth Embodiment

Next, a process of a fifth embodiment is explained with reference to FIG. 4.

In this embodiment, an upper limit number of assigning mobile stations in arbitrary radio frame transmitting timing, and all the powers to be assigned to mobile stations are set to the same value. The system configuration is the same as in FIG. 1 explained in the first embodiment, and conditions of the predetermined power and the code resource upper limit, etc., are also the same as those of the first embodiment.

The mobile station power assignment setting unit 5 of the RNC 1 sets the upper limit number of assigning mobile stations to, for example, 4, divides the predetermined power of 80% equally into four, and sets the offset Γ to 3 dB so that all the powers to be assigned to the mobile stations become 20%, that is, twice the CPICH power.

The RNC 1 informs the base station 2 of the upper limit number of mobile stations, and the scheduler 8 performs assignment of mobile stations in a certain radio frame transmitting timing according to the status of the transmission data queue, CQI values informed by the mobile stations, and the number of remaining code resources. However, the scheduler does not assign to any mobile station more than four due to restriction of the upper limit number of assigning mobile stations. Therefore, as in the case of the radio frame transmitting timing=T1 (using 15 code resources) on the left side of FIG. 4, the predetermined power can be assigned to all HS-PDSCHs as long as the code resources are sufficient.

Figure 4:
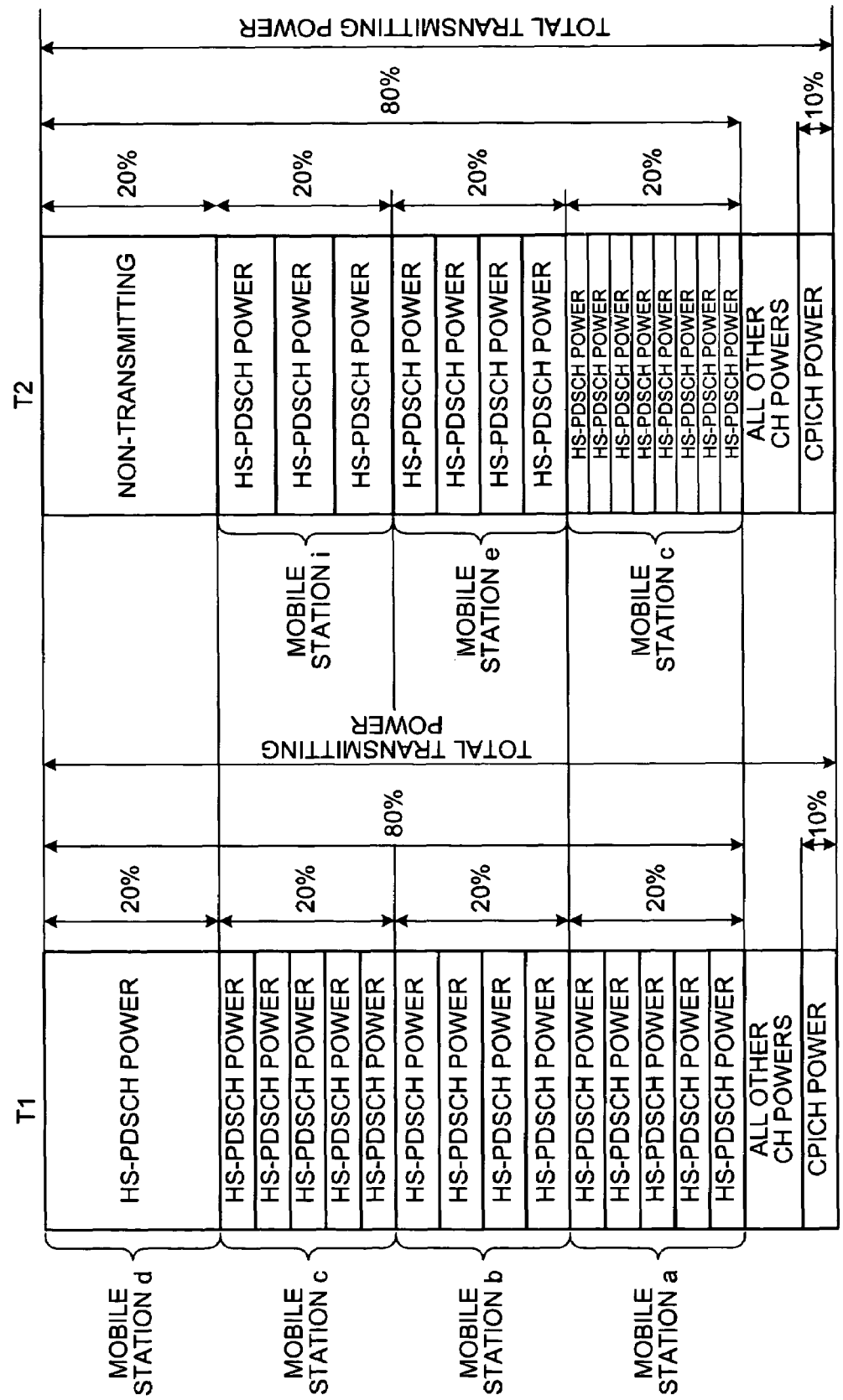
FIG. 4 is a diagram to explain an operation according to a fifth embodiment of the invention.

In the case of the radio frame transmitting timing=T2 on the right side of FIG. 4, the upper limit 15 code resources are used at three mobile stations, so that the power of 20% is non-transmitting power.

In the radio frame transmitting timing=T1, the power is assigned to four mobile stations as shown in FIG. 4, and in the radio frame transmitting timing=T2, the operations of assignment to three mobile stations are carried out by the scheduler 8. However, in this embodiment, the powers to be assigned to the mobile stations and the upper limit number of mobile stations are determined in advance by the RNC 1, so that the total of the assigning powers becomes the predetermined power. Therefore, the scheduler 8 does not need to acquire power assignments from the transmitting power control unit 10 before scheduling, and the constitution and operations of the scheduler 8 are simplified.

Sixth Embodiment

A sixth embodiment is explained with reference to FIG. 5 and FIG. 6. The system configuration is the same as that of FIG. 1 explained in the first embodiment, and conditions of the predetermined power and the upper limit of code resources, etc., are also the same as those of the first embodiment.

In this embodiment, similar to the fifth embodiment, the upper limit number of assigning mobile stations in an arbitrary radio frame transmitting timing is determined. The difference from the fifth embodiment is in that the mobile station power assignment setting unit 5 of the RNC 1 groups the mobile stations by service classes and distance from the base station, etc., and assigns power distribution to the mobile stations according to this grouping.

Such power distribution is realized by setting the offsets Γ by the RNC 1 for the mobile station assigning power setting unit c5 according to "CPICH Ec/No of measured results on RACH" as "Information Element" of "RRC connection request" message of the "3GPP Specification TS25.331 10.2.39".

Like the fifth embodiment, it is assumed that RNC 1 sets the upper limit number of assigning mobile stations to 4.

For example, it is assumed that the scheduler sets the mobile stations a through f as transmission candidates according to the status of the transmission data queue, CQI values, and the number of remaining code resources, etc., in a certain radio frame transmitting timing.

Figure 5:
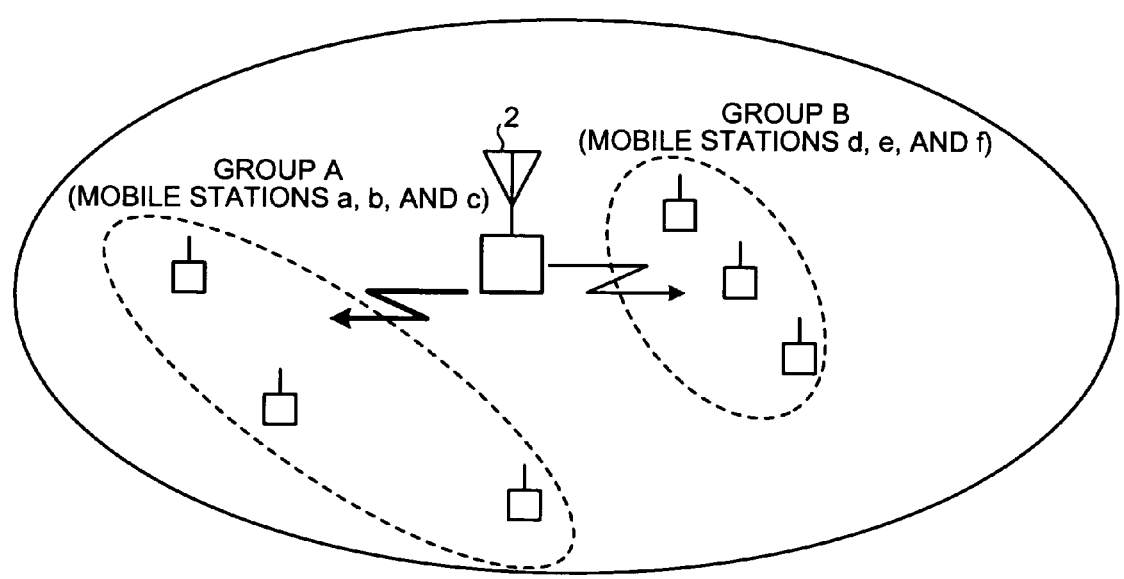
FIG. 5 is a diagram to explain mobile station grouping according to a sixth embodiment of the invention.
Figure 6:
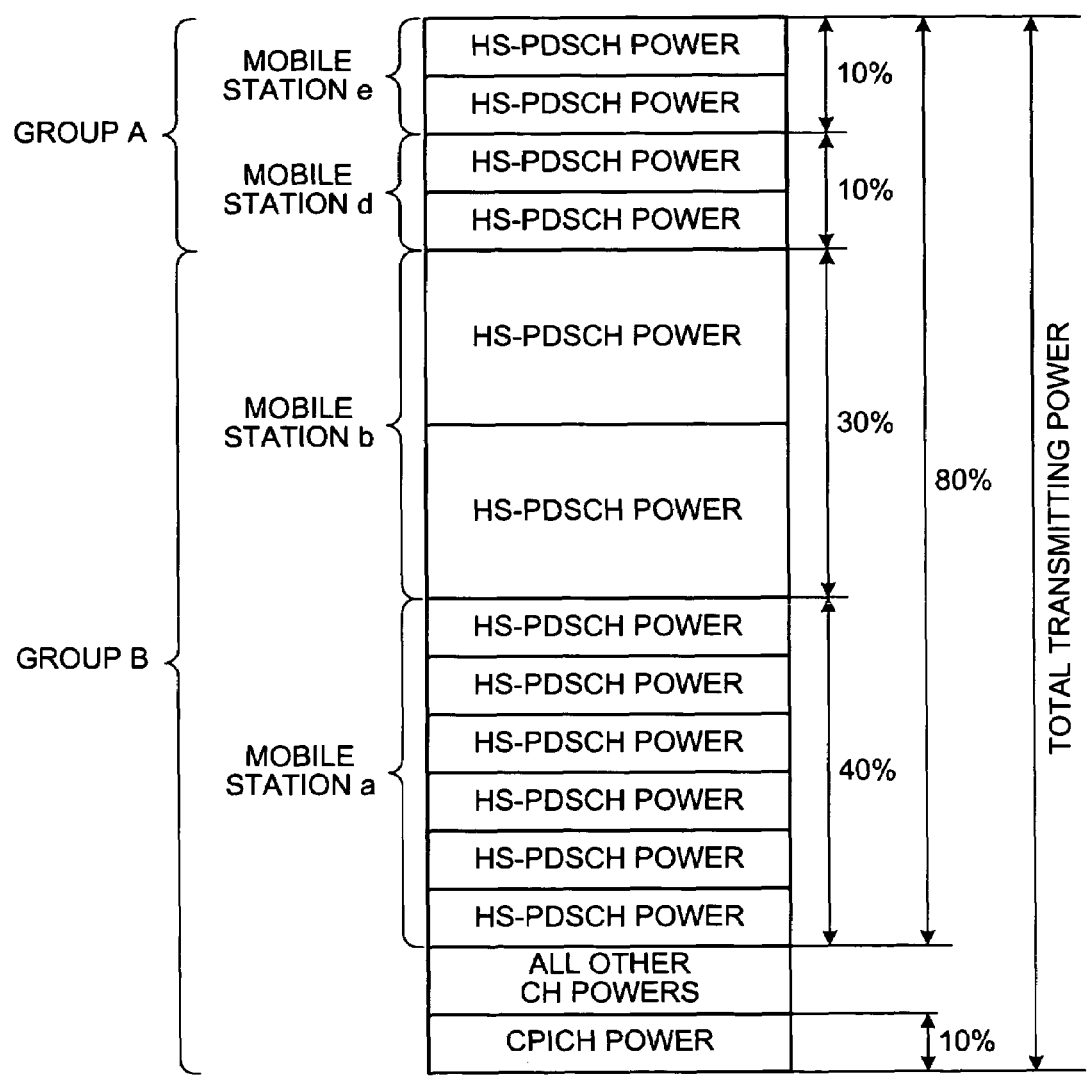
FIG. 6 is a diagram to explain an operation according to the sixth embodiment of the invention.

Herein, as shown in FIG. 5, the mobile stations a, b, and c belong to the mobile station group A with the power distribution of 30%, and the mobile stations d, e, and f belong to the mobile station group B with the power distribution of 10%, according to setting of the offsets Γ. Therefore, the scheduler 8 selects two mobile stations from each mobile group. The priorities in the group A are in the order corresponding to the mobile stations a, b, and c, and the priorities in the group B are in the order corresponding to the mobile stations d, e, and f. Thus, the mobile stations a and b are assigned, and the mobile station c is not assigned, and the mobile stations d and e with the next higher priorities are assigned.

Thus, while satisfying the condition of the upper limit number of assigning mobile stations of 4, two stations are selected from the mobile station group A, and two stations are selected from the mobile station group B. Thus, the mobile stations a, b, d, and e are assigned, and the predetermined power of 80% can be used in just proportion, whereby the throughput of the communication system improves.

Seventh Embodiment

An operation of a seventh embodiment is explained next, with reference to FIG. 7. The system configuration is the same as that of FIG. 1 explained in the first embodiment, and the conditions of the predetermined power and the upper limit of code resources, etc., are also the same as those of the first embodiment.

In the first embodiment, when the sum of HS-PDSCH powers of the mobile stations selected as transmission candidates exceeds the predetermined power, some mobile stations are not assigned. However, in this embodiment, by changing the HS-PDSCH power distributions of the mobile stations, the mobile stations are prevented from not being assigned.

Figure 7:
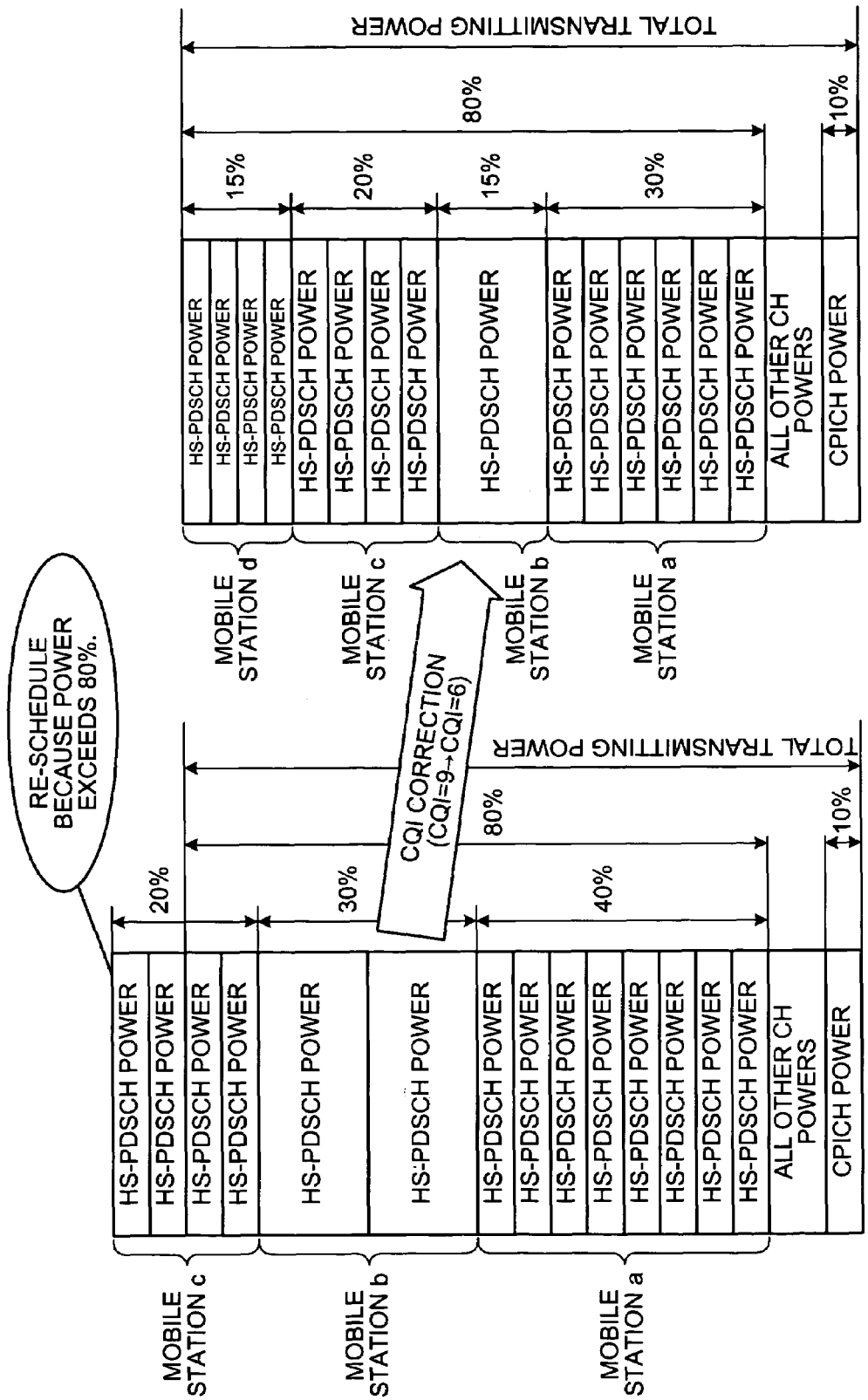
FIG. 7 is a diagram to explain an operation according to a seventh embodiment of the invention.

In this embodiment, first, as in the first embodiment, as shown on the left side of FIG. 7, in a certain radio frame transmitting timing, three mobile stations are selected as transmission candidates according to the status of the transmission data queue, CQI values informed from the mobile stations, and the number of remaining code resources. The transmitting power assignments are the same as those of the first embodiment.

Because the sum of the powers to be assigned to the mobile stations a through c exceeds the predetermined power of 80%, the scheduler 8 carries out re-scheduling in response to an instruction of the transmitting power control unit 10 so that, for example, the power distribution of 40% to the mobile station a is reduced to 30%, and the power distribution of 30% to the mobile station b is reduced to 15%. Next, the scheduler 8 applies adaptive modulation upon correcting CQI values received from the mobile stations, according to this distribution. Herein, the priorities of power reduction are in the order corresponding to the mobile stations a, b and so on.

As in the case of the fourth embodiment, CQI correction corresponding to the power reduction ratio is carried out by setting reduction of one CQI value per 1 dB. In this embodiment, 15% assignment is set by re-scheduling for the mobile station that can be assigned with 30% power, so that CQI=9 is reduced by 3 dB to CQI=6, and then the assignment of 2 as the number of code resources is reduced to 1 from FIG. 2. The same procedures are executed for CQI correction of a mobile station that can be assigned with 40% power.

Furthermore, the power of 15% remains conversely due to re-scheduling, and it becomes possible to further assign to the mobile station 4 with an HS-PDSCH power of 15%.

With this constitution, it becomes possible to use the predetermined power of 80% in just proportion, and communication with more mobile stations can be carried out in one radio frame transmitting timing.

It is also possible that the sum of powers of the mobile stations a through c be set to 80% by reducing the power of the mobile station a, having the greatest HS-PDSCH power, to 30%.

Eighth Embodiment

An operation of an eighth embodiment is explained with reference to FIG. 8. The system configuration is the same as that of FIG. 1 explained in the first embodiment, and the conditions of the predetermined power and the upper limit number of code resources are also the same as those of the first embodiment.

Figure 8:
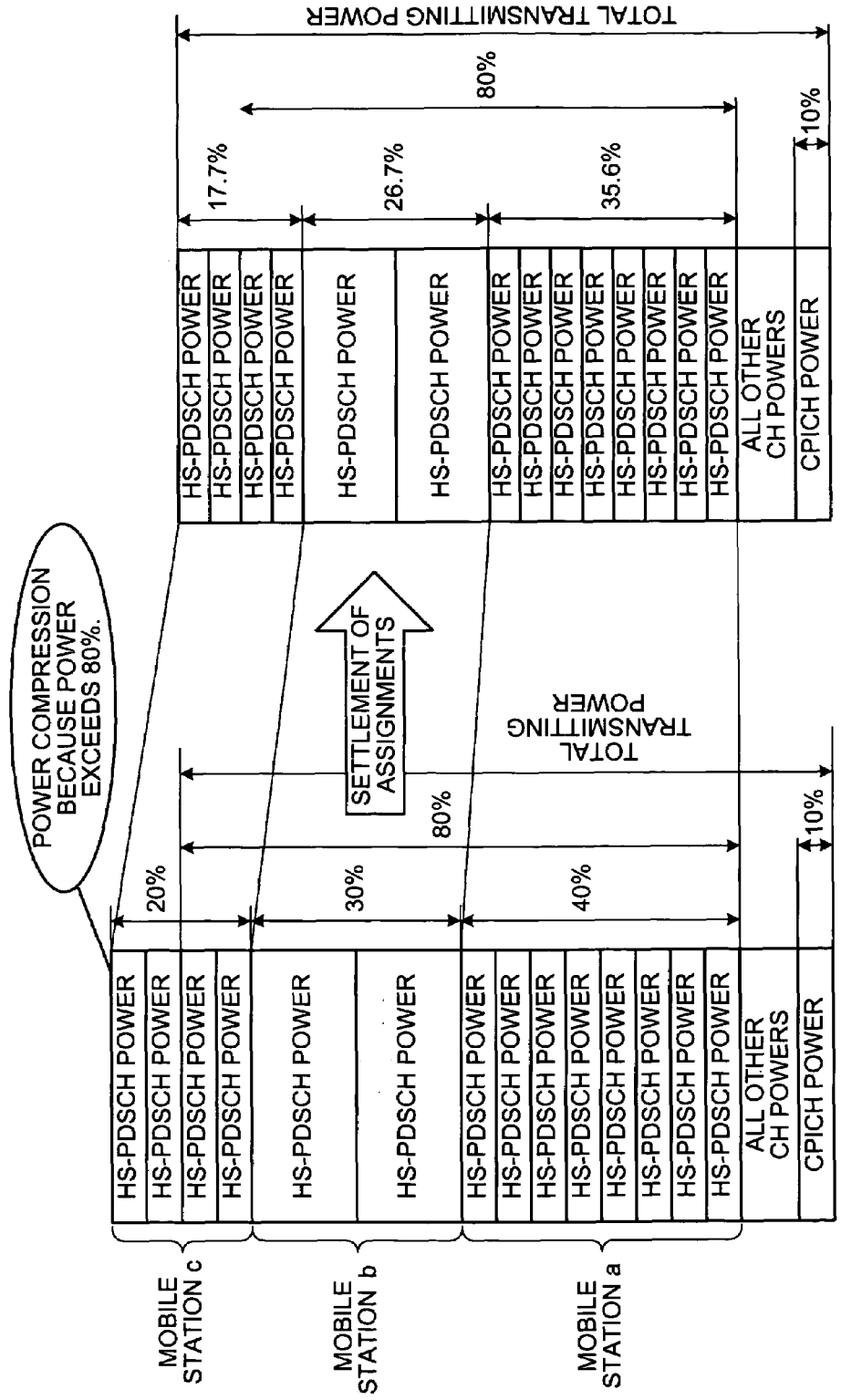
FIG. 8 is a diagram to explain an operation according to an eighth embodiment of the invention.

As shown on the left side of FIG. 8, the scheduler 8 selects three mobile stations as transmission candidates according to the status of the transmission data queue, CQI values informed from the mobile stations, and the number of remaining code resources in a certain radio frame transmitting timing. The transmitting power assignments are set to the same as those of the first embodiment. The sum of the powers assigned to the mobile stations a through c is 90%, which exceeds the predetermined power of 80%. However, the transmitting power control unit 10 compresses the assigning powers of the mobile stations to 80%/90% and transmits these.

As a result, as shown on the right side of FIG. 8, the HS-PDSCH power of the mobile station a is:

40×80/90=35.6(%)

and likewise, the HS-PDSCH power of the mobile station b is 26.7(%), and the HS-PDSCH power of the mobile station c is 17.7(%).

In this embodiment, compressing the transmitting powers tends to increase transmission errors. However, re-assignment by the scheduler 8 is not necessary, and the constitution and operation procedures of the scheduler 8 can be simplified.

Ninth Embodiment

Figure 9:
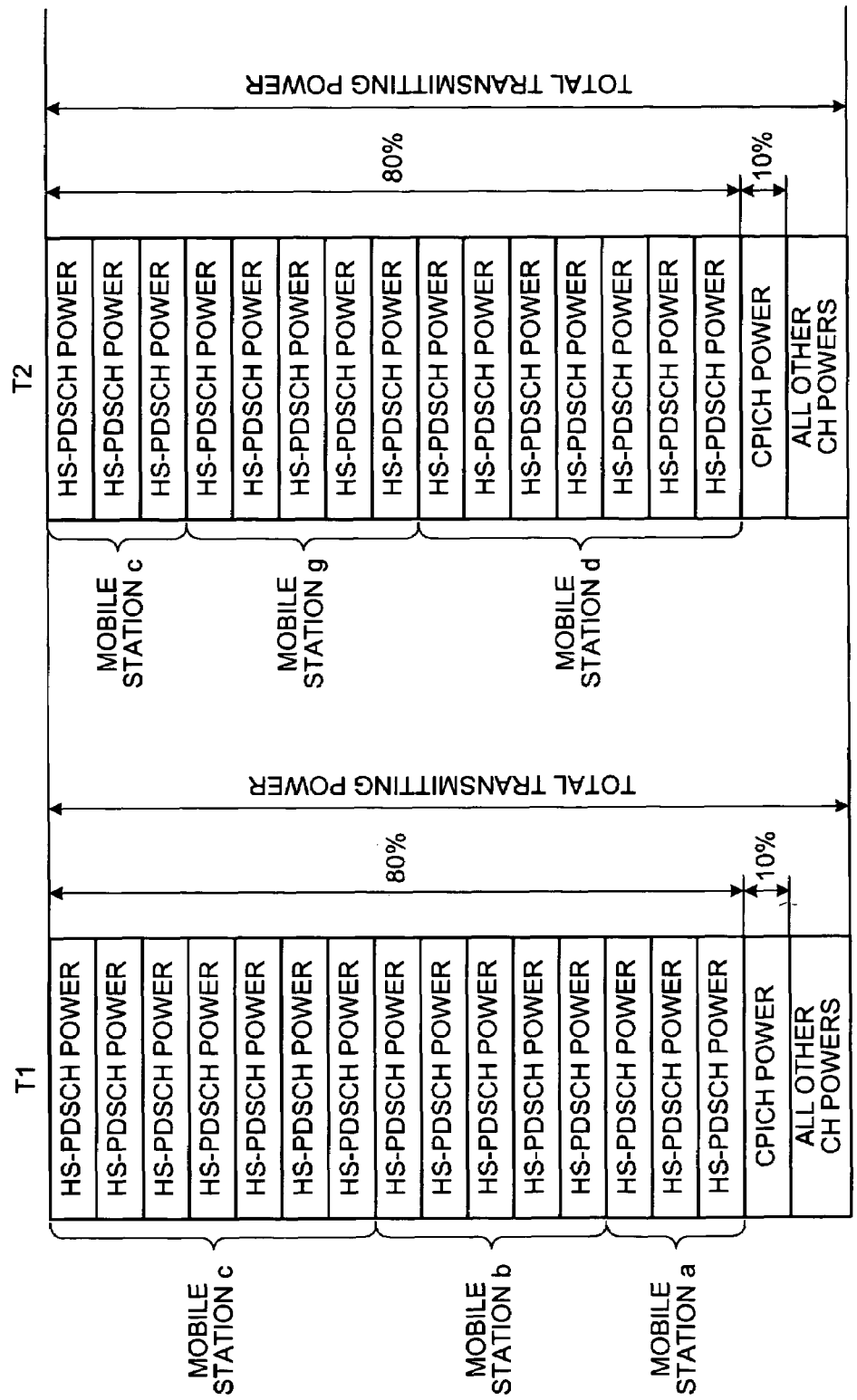
FIG. 9 is a diagram to explain an operation according to a ninth embodiment of the invention.

An operation of a ninth embodiment is explained with reference to FIG. 9. The system configuration is the same as that of FIG. 1 explained in the first embodiment, and the conditions of the predetermined power and the upper limit number of code resources are also the same as those of the first embodiment.

In this embodiment, the offset $\Gamma$ is defined as a power offset between the HS-PDSCH transmitting power (total assigning power) to be transmitted by the base station and CPICH transmitting power. Therefore, the transmitting power of CPICH with respect to the total transmitting power of the base station is set to 10%, the power of all other channels is set to 10%, and the predetermined power permitted by all the HS-PDSCHs is set to 80%, and the following equation is obtained by using the same assumption as in the embodiments described above:

Offset $\Gamma$=80%/10%=9 dB

This becomes constant regardless of the mobile station, and is determined by the mobile station power assignment setting unit 5 of the RNC 1.

Herein, it is assumed that three mobile stations a, b, and c are selected in advance as transmission candidates according to the status of the transmission data queue 7, CQI values informed from the mobile stations 3, and the number of remaining code resources.

At this point, a value estimated according to the definition of the offset $\Gamma$ by each mobile station as received HS-PDSCH power $P_{HSPDSCH}$ from the CPICH power $P_{CPICH}$ corresponds to the number of all HS-PDSCHs of the base station, that is, 15 herein. This received HS-PDSCH power $P_{CPICH}$ is estimated using Formula (1) explained in the first embodiment. $P_{CPICH}$ at the mobile station is CPICH received power at the mobile station.

$P_{HSPDSCH}$ (mobile station assigning power estimate) calculated by each mobile station using Formula (1) is the sum of the transmitting powers $P_{HSPDSCH}$ of all the 15 HS-PDSCHs, and based on this, each mobile station determines its own CQI value, and informs the base station 2 of this value.

$P_{HSPDSCH}$ calculated (estimated) herein is a power estimate to be assigned to a mobile station in the invention.

The offset $\Gamma$ herein is a ratio between the received HS-PDSCH power $P_{HSPDSCH}$ and the CPICH received power, and can be referred to as a received power ratio. For calculating $P_{HSPDSCH}$ from $P_{CPICH}$ using a calculating formula other than (1) the offset can be referred to as a received power calculation parameter.

On the other hand, $P_{HSPDSCH}$ to be calculated by the scheduler 8 of the base station 2 using Formula (1) is also the sum of the transmitting powers $P_{HSPDSCH}$ to be assigned to the mobile stations. This is equal to the predetermined power (the total transmitting power of 80%), and is assigned equally to the respective HS-PDSCHs. Therefore, as shown in FIG. 9, when the number of HS-PDSCHs to be assigned to the mobile station a is set to 3, the HS-PDSCH power to be actually received by the mobile station a is 3/15=−7 dB with respect to the estimate by the mobile station a. Therefore, the base station 2 corrects the CQI received from the mobile station a by 7 dB. Namely, adaptive modulation is applied upon carrying out correction to reduce seven from the CQI value.

However, the CQI table of FIG. 2 is prepared so that the mobile station receiving signal power difference at an adjacent CQI value becomes a 1-dB step. The same applies to other mobile stations.

With this constitution, the HS-PDSCH transmitting power of the base station can be used in just proportion.

It also becomes possible for the base station to properly correct the CQI value determined based on the HS-PDSCH power excessively estimated by the mobile station, transmission errors are reduced, and the communication quality of the communication system improves.

Tenth Embodiment

Next, an operation of a tenth embodiment is explained with reference to FIG. 10. The system configuration is the same as that of FIG. 1 explained in the first embodiment, and the conditions of the predetermined power and the upper limit number of code resources are also the same as those of the first embodiment.

The difference from the ninth embodiment is in that CQI correction according to the total number of HS-PDSCHs is carried out even when the total number of HS-PDSCHs assigned in a certain radio frame transmitting timing is less than 15.

In this embodiment, as in the case of the ninth embodiment, the offsets $\Gamma$ are defined as power offsets between all the HS-PDSCHs to be transmitted by the base station and the CPICH. Therefore, the CPICH transmitting power is 10% of the total transmitting power of the base station, power of all other channels is 10%, and the predetermined power permitted by all the HS-PDSCH is 80%, and using the same assumption as in the embodiments given above, the offsets become constant as:

Offset Γ=80%/10%=9 dB.

This determination is carried out by the mobile station power assignment setting unit 5 of the RNC 1.

At this point, according to the definition of the offset Γ, the values estimated by the respective mobile stations as received HS-PDSCHs from the CPICH power are the total transmitting power of the HS-PDSCHs of the base station.

Figure 10:
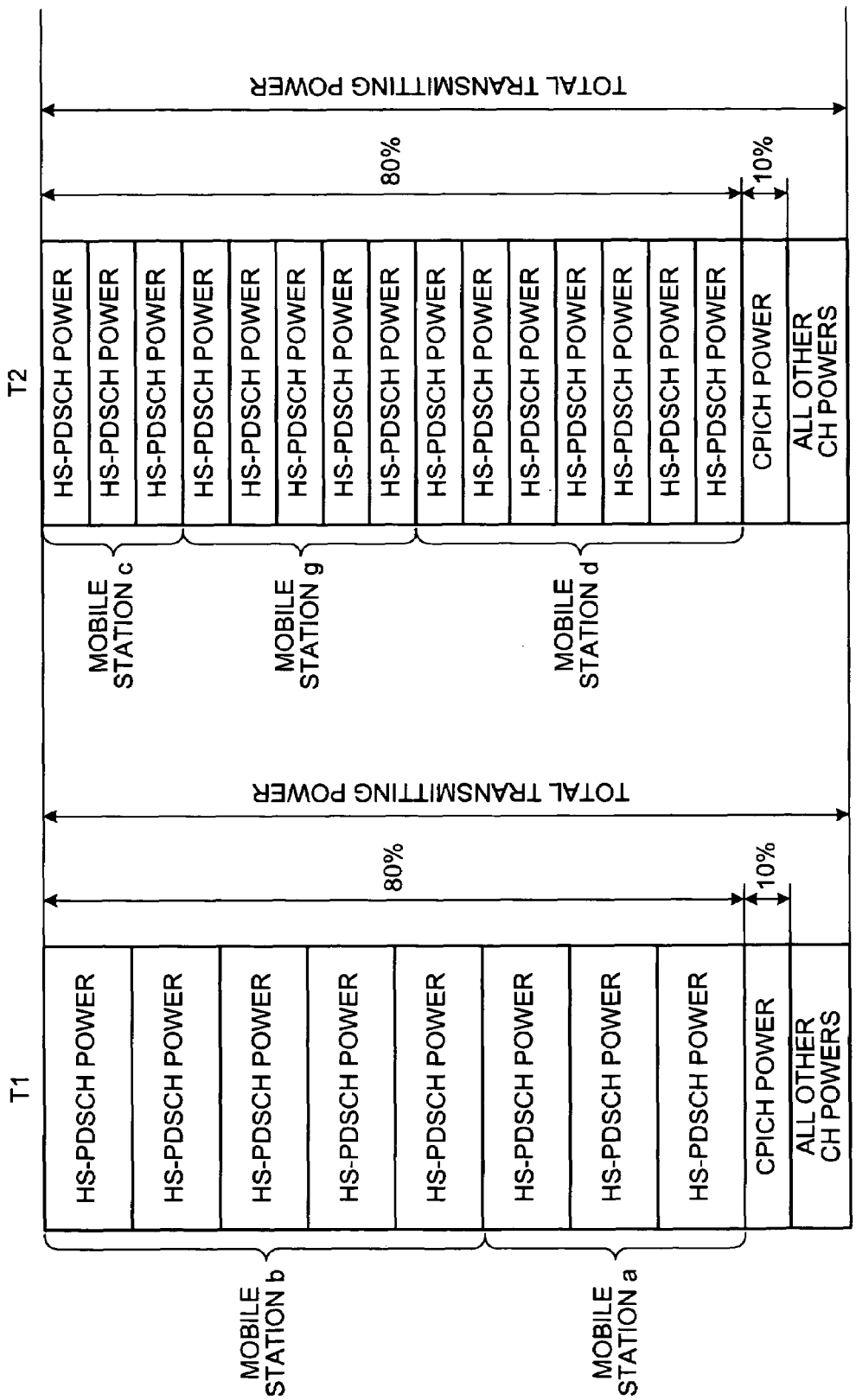
FIG. 10 is a diagram to explain an operation according to a tenth embodiment of the invention.

As shown in FIG. 10, when it is assumed that, in the radio frame transmitting timing T1, the number of HS-PDSCHs to be assigned to the mobile station a is set to three, and the number of HS-PDSCHs to be assigned to the mobile station b is five, the total number of HS-PDSCHs is eight, and HS-PDSCH power to be received by the mobile station a in actuality is 3/8=−4.3 dB for the same reason as in the ninth embodiment.

When it is assumed that the CQI table of FIG. 2 is prepared so that the mobile station receiving signal power difference at an adjacent CQI value is 1-dB step, 4.3 must be subtracted from the CQI values. However, the CQI values are integers, and so, 5 is subtracted from the CQI values by employing the safe side of the error ratio, and then subjected to adaptive modulation.

As in case of the example given above, when the necessary subtraction quantity is not an integer, the first decimal place of the quantity is raised to an integer.

As described above, in this embodiment, even when the total number of HS-PDSCHs assigned in a certain radio frame transmitting timing is less than the number of all HS-PDSCHs of the base station (15 in the embodiment), CQI correction according to the total number of HS-PDSCHs to be used is carried out, so that transmission efficiency improves.

In the explanation given above, when the necessary CQI subtraction quantity is not an integer, the first decimal place is raised to an integer. However, when the first decimal place is zero, the decimal fractions may be rounded off to an integer.

In the explanation of all the embodiments above, the CPICH power is set to 10%. However, it may have other values. Similarly, although the total power of HS-PDSCHs is set to 80%, generality is not lost even if the total power has other values. In addition, although the predetermined number of assigning mobile stations is set to 4, it may be another number such as 8. Furthermore, although the maximum number of HS-PDSCHs is set to 15, it may be another number such as 10.

Thus, according to the present invention, it is possible to secure communication quality in a communication system.

INDUSTRIAL APPLICABILITY

As explained above, the communication method of the invention is useful for a radio communication system that controls transmitting power, and is especially suitable for a base station that controls transmitting power so as to keep the total transmitting powers of HS-PDSCHs within a predetermined power.

The invention claimed is:

1. A base station that communicates with a plurality of mobile stations using a common channel and a plurality of shared channels, wherein the common channel is common to the mobile stations, and a predetermined number of the plurality of shared channels can be assigned to the respective mobile stations, the base station comprising:
   a scheduler that acquires, for each of the mobile stations, a transmitting power ratio that is a ratio of a mobile station assigning power, which is a sum of transmitting powers of the shared channels assigned to the mobile station, and a transmitting power of the common channel; wherein
   the scheduler determines the mobile station assigning power of the mobile station from the transmitting power ratio acquired and the transmitting power of the common channel, and
   the scheduler selects communication destination mobile stations, so that a sum of the mobile station assigning powers does not exceed a predetermined maximum assignable power.

2. The base station according to claim 1, wherein if the sum of the mobile station assigning powers of the communication destination mobile stations selected is less than the predetermined maximum assignable power, the scheduler increases a mobile station assigning power of at least one communication destination mobile station.

3. The base station according to claim 2, wherein when the scheduler increases the mobile station assigning power of the communication destination mobile station, the scheduler corrects a channel quality indicator, which indicates channel quality of the shared channels and which is informed by the communication destination mobile station, based on an increase in the mobile station assigning power.

4. The base station according to claim 1, wherein the scheduler acquires a maximum number of communication destination mobile stations, and assigns the predetermined maximum assignable power to the mobile stations, the number of mobile stations being not more than the maximum number of mobile stations.

5. The base station according to claim 1, wherein if the sum of the mobile station assigning powers of the communication destination mobile stations selected exceeds the predetermined maximum assignable power, the scheduler reduces the mobile station assigning power of at least one communication destination mobile station.

6. The base station according to claim 5, wherein when the mobile station assigning power of the communication destination mobile station is reduced, the scheduler corrects a channel quality indicator, which indicates the channel quality of the shared channels and which is informed by the communication destination mobile station, based on a reduction in the mobile station assigning power.

7. The base station according to claim 1, wherein a predetermined number of the plurality of shared channels are assigned to a predetermined mobile station at predetermined time intervals, and
   the scheduler selects communication destination mobile stations, so that the sum of the mobile station assigning powers do not exceed a predetermined maximum assignable power at the predetermined time intervals.

8. A base station that communicates with a plurality of mobile stations using a common channel and a plurality of shared channels, wherein the common channel is common to the mobile stations and a predetermined number of the plurality of shared channels can be assigned to the respective mobile stations, the base station comprising:

a scheduler that acquires a transmitting power ratio of a total assigning power, which is a sum of transmitting powers assigned to the shared channels, and a transmitting power of the common channel; wherein
    the scheduler determines the total assigning power from the transmitting power ratio acquired and the transmitting power of the common channel, and
    the scheduler determines a mobile station assigning power, which is a sum of transmitting powers of shared channels assigned to each communication destination mobile station, by dividing the total assigning power determined, by a number of shared channels assigned to each communication destination mobile station.

9. The base station according to claim 8, wherein
when the transmitting power ratio is acquired, a mobile station assigning power estimate is estimated from the transmitting power ratio acquired and a received power of the common channel of the communication destination mobile station,
the communication destination mobile station informs a channel quality indicator that indicates channel quality of the shared channels based on the mobile station assigning power estimate and the received power of the common channel, and
the scheduler corrects the channel quality indicator informed, based on the mobile station power estimate of the communication mobile station and the mobile station assigning power of the communication destination mobile station.

10. A mobile station in a communication system for communication between a plurality of mobile stations and a base station, using a common channel and a plurality of shared channels, wherein the common channel is common to the mobile stations and a predetermined number of the plurality of shared channels can be assigned to the respective mobile stations, the mobile station comprising:
an acquiring unit that acquires a received power ratio that is a ratio of a mobile station received power, which is a sum of received powers of the shared channels transmitted to the mobile station, and a received power of the common channel, wherein the received power ratio is determined for the mobile station;
an estimating unit that estimates a mobile station assigning power estimate, which is a transmitting power value of shared channels assigned to the mobile station, from the received power ratio acquired and the received power of the common channel of the mobile station; and
an informing unit that informs the base station of a channel quality indicator, which indicates channel quality of the shared channels, based on the mobile station assigning power estimate.

11. A mobile station in a communication system for communication between a plurality of mobile stations and a base station, using a common channel and a plurality of shared channels, wherein the common channel is common to the mobile stations and a predetermined number of the plurality of shared channels can be assigned to the respective mobile stations, the mobile station comprising:
an acquiring unit that acquires a received power ratio that is a ratio of a total assigning power, which is a sum of transmitting powers assigned by the base station to the shared channels, and a received power of the common channel; and
an estimating unit that estimates a mobile station assigning power estimate, which is a transmitting power value of shared channels assigned to the mobile station, from the received power ratio acquired and the received power of the common channel of the mobile station, and
an informing unit that informs the base station of a channel quality indicator, which indicates channel quality of the shared channels, based on the mobile station assigning power estimate.

12. A communication system comprising:
a base station; and
a plurality of mobile stations that communicate with the base station using a common channel and a plurality of shared channels, wherein the common channel is common to the mobile stations and a predetermined number of the plurality of shared channels can be assigned to the respective mobile stations, wherein
the base station includes a scheduler that acquires, for each mobile station, a transmitting power ratio that is a ratio of a mobile station assigning power, which is a sum of transmitting powers of the shared channels assigned to the mobile station, and a transmitting power of the common channel, determines the mobile station assigning powers of the mobile stations from the transmitting power ratio acquired and the transmitting power of the common channel, and selects communications destination mobile stations so that a sum of the mobile station assigning powers does not exceed a predetermined maximum assignable power; and
the mobile station acquires a received power ratio that is a ratio of a mobile station received power, which is a sum of received powers of the shared channels transmitted to itself, and a received power of the common channel, determines the received power ratio for itself, estimates a mobile station assigning power estimate, which is a transmitting power value of shared channels assigned to itself, from the received power ratio acquired and the received power of the common channel of the mobile station itself, and informs the base station of a channel quality indicator, which indicates channel quality of the shared channels, based on the mobile station assigning power estimate.

13. A communication system comprising:
a base station; and
a plurality of mobile stations that communicate with the base station using a common channel and a plurality of shared channels, wherein the common channel is common to the mobile stations and a predetermined number of the plurality of shared channels can be assigned to the respective mobile stations, wherein
the base station includes a scheduler that acquires a transmitting power ratio of a total assigning power, which is a sum of transmitting powers assigned to the shared channels, and a transmitting power of the common channel, determines the total assigning power from the transmitting power ratio acquired and the transmitting power of the common channel, and determines mobile station assigning power, which is a sum of transmitting powers of shared channels assigned to each communication destination mobile station, by dividing the total assigning power determined, by a number of shared channels assigned to each communication destination mobile station; wherein
when the transmitting power ratio is acquired, a mobile station assigning power estimate is estimated from the transmitting power ratio acquired and a received power of the common channel of the communication destination mobile station, the communication destination mobile station informs a channel quality indicator that indicates channel quality of the shared channels based on the mobile station assigning power estimate and the received power of the common channel, and the scheduler corrects the channel quality indicator informed, based on the mobile station power estimate and the mobile station assigning power of the communication destination mobile station; and the mobile station acquires a received power ratio that is a ratio of a total assigning power, which is a sum of transmitting powers assigned by the base station to the shared channels, and a received power of the common channel, estimates a mobile station assigning power estimate, which is a transmitting power value of shared channels assigned to the mobile station itself, from the received power ratio acquired and the received power of the common channel of the mobile station itself, and informs the base station of a channel quality indicator, which indicates channel quality of the shared channels, based on the mobile station assigning power estimate.

14. A communication method in a base station for communicating with a plurality of mobile stations using a common channel and a plurality of shared channels, wherein the common channel is common to the mobile stations and a predetermined number of the plurality of shared channels are assigned to the respective mobile stations, comprising:

acquiring/determining for each mobile station, a transmitting power ratio that is a ratio of a mobile station assigning power, which is a sum of transmitting powers of the shared channels assigned to the mobile station, and a transmitting power of the common channel;

determining the mobile station assigning power of the mobile station from the transmitting power ratio acquired and the transmitting power of the common channel; and selecting communication destination mobile stations, so that a sum of the mobile station assigning powers does not exceed a predetermined maximum assignable power.

15. A communication method in a base station for communicating with a plurality of mobile stations using a common channel and a plurality of shared channels, wherein the common channel is common to the mobile stations, and a predetermined number of the plurality of shared channels can be assigned to the respective mobile stations, comprising:

acquiring a transmitting power ratio of a total assigning power, which is a sum of transmitting powers assigned to the shared channels, and a transmitting power of the common channel;

determining a total assigning power from the transmitting power ratio acquired and the transmitting power of the common channel; and determining a mobile station assigning power, which is a sum of transmitting powers of shared channels assigned to each communication destination mobile station, by dividing the total assigning power determined, by a number of shared channels assigned to each communication destination mobile station.

16. A communication method in a communication system for communication between a plurality of mobile stations and a base station using a common channel and a plurality of shared channels, wherein the common channel is common to the mobile stations and a predetermined number of the plurality of shared channels can be assigned to the respective mobile stations, comprising:

acquiring, performed by the mobile station, including acquiring a transmitting power ratio that is a ratio of a mobile station assigning power, which is a sum of transmitting powers of the shared channels assigned to the mobile station itself, and a transmitting power of the common channel determined for itself;

estimating, performed by the mobile station, including estimating a mobile station assigning power estimate, which is a transmitting power value of shared channels assigned to itself, from the transmitting power ratio acquired and a received power of the common channel of the mobile station itself;

informing, performed by the mobile station, including informing the base station of a channel quality indicator indicating channel quality of the shared channels, based on the mobile station assigning power estimate;

acquiring/determining, performed by the base station for each mobile station, including acquiring/determining a transmitting power ratio that is a ratio of a mobile station assigning power, which is a sum of transmitting powers of the shared channels assigned to the mobile station, and a transmitting power of the common channel;

determining, performed by the base station, including determining mobile station assigning powers of the mobile stations from the transmitting power ratio acquired and the transmitting power of the common channel; and selecting, performed by the base station, including selecting communication destination mobile stations so that a sum of the mobile station assigning powers of the communication destination mobile stations does not exceed a predetermined maximum assignable power; wherein if the sum of the mobile station assigning powers of the communication destination mobile stations selected is less than the predetermined maximum assignable power, the base station increases a mobile station assigning power of at least one communication destination mobile station, and based on an increase in the mobile station assigning power, the base station corrects a channel quality indicator that is informed by the communication destination mobile station whose the mobile station assigning power is increased.

17. A communication method in a communication system for communication between a plurality of mobile stations and a base station using a common channel and a plurality of shared channels, wherein the common channel is common to the mobile stations and a predetermined number of the plurality of shared channels can be assigned to the respective mobile stations, comprising:

acquiring, performed by the mobile station, including acquiring a transmitting power ratio that is a ratio of a total assigning power, which is a sum of transmitting powers assigned by the base station to the shared channels, and a transmitting power of the common channel;

estimating, performed by the mobile station, including estimating a mobile station assigning power estimate, which is a transmitting power value of shared channels assigned to itself, from the transmitting power ratio acquired and received powers of the shared channels;

informing, performed by the mobile station, including informing the base station of a channel quality indicator indicating channel quality of the shared channels, based on the mobile station assigning power estimate;

acquiring, performed by the base station, including acquiring a transmitting power ratio that is a ratio of a total assigning power, which is a sum of transmitting powers assigned to the shared channels, and a transmitting power of the common channel;

determining, performed by the base station, including determining the total assigning power from the transmitting power ratio acquired and the transmitting power of the common channel, and determining a mobile station assigning power, which is a sum of transmitting powers of shared channels assigned to each communication destination mobile station, by dividing the total assigning power determined, by a number of shared channels assigned to each communication destination mobile station; and correcting, performed by the base station, including correcting the channel quality indicator informed by the mobile station, based on the mobile station power estimate and the mobile station assigning power.

* * * * *